United States Patent [19]

Thompson

[11] Patent Number: 4,493,053
[45] Date of Patent: Jan. 8, 1985

[54] MULTI-DEVICE APPARATUS SYNCHRONIZED TO THE SLOWEST DEVICE

[75] Inventor: Dennis J. Thompson, Geneva, Ill.

[73] Assignee: AT&T Bell Laboratories, Murray Hill, N.J.

[21] Appl. No.: 448,824

[22] Filed: Dec. 10, 1982

[51] Int. Cl.³ .............................................. G06F 1/00
[52] U.S. Cl. .................................................. 364/900
[58] Field of Search ... 364/200 MS File, 900 MS File

[56] References Cited

U.S. PATENT DOCUMENTS 4,153,941  5/1979  Caddell .............................. 364/900

OTHER PUBLICATIONS

*Macrologic Bipolar Microprocessor Data Book*, pp. 5-35 through 5-44, (Fairchild Camera and Instrument Corporation, 1976).
9403 First-In First-Out (FIFO) Buffer Memory Device Specification, pp. 7-173 through 7-186, Fairchild TTL Macrologic.
Type '283 4-Bit Binary Full Adders with Fast Carry, Device Specification, pp. 7-415 through 7-419.

*Primary Examiner*—Raulfe B. Zache
*Attorney, Agent, or Firm*—D. Volejnicek

[57] ABSTRACT

A synchronous apparatus synchronized to the operation of the slowest device is disclosed, comprising a plurality of devices such as first-in first-out buffer memories (FIFOs) connected to at least one synchronizing mechanism such as a full adder circuit. Each device generates a signal to indicating readiness to operate and a signal indicating completion of operation. Each device receives a signal causing the device to operate and a signal causing the device to stop operating. The synchronizing mechanism generates the operate signal upon sensing the readiness signals of all the devices and continues to generate the operate signal while at least one of the ready signals is sensed. The synchronizing mechanism generates the stop signal upon sensing the completion signal from all of the devices and continues to generate that signal while at least one of the completion signals is sensed.

13 Claims, 4 Drawing Figures

4,493,053

MULTI-DEVICE APPARATUS SYNCHRONIZED TO THE SLOWEST DEVICE

TECHNICAL FIELD

The invention relates to synchronous mechanisms, and in particular to arrays of synchronized electronic devices.

BACKGROUND OF THE INVENTION

Need often arises to operate a plurality of devices as a single unit, in precise step with each other. It is therefore necessary to synchronize the operation of the plurality of devices. The slowest of the devices is the limiting factor on the speed of operation of the synchronized devices, and all devices must be synchronized to the slowest one.

For example, in the computer field, first-in first-out buffer memories (FIFOs) are commonly utilized for interfacing inputs and outputs of a device to another device or to a communication link. While the width of a communication link or of a device's input and output port can vary widely, FIFOs are commonly available in a standard width, for example of four bits. Hence, for purposes of interfacing a port or link wider than the standard FIFO width, a plurality of FIFOs commonly must be used in an array configuration and operated in step. To assure proper operation of the FIFO array, the FIFOs must be synchronized to the operation of the slowest of the FIFOs, both in terms of commencing operation and of terminating operation.

The prior art has proposed schemes for synchronizing the operation of the FIFOs. However, certain proposed schemes have been found not to be operational, and those that are functional have been found to introduce significant delay into the operation of the FIFOs. But, as the speed of operation of computing and communication systems increases, the operational speed of such FIFO arrays often becomes the limiting factor on system operation, and the delays caused by the prior art synchronizing mechanisms become unacceptable in terms of system performance.

SUMMARY OF THE INVENTION

The invention is directed toward solving these and other disadvantages of the prior art.

The invention concerns a novel synchronous apparatus which includes a plurality of devices for operating synchronously. Each device generates a first signal to indicate readiness to operate and a second signal to indicate completion of operation. Each device receives a third signal for causing the device to operate and a fourth signal for causing the device to stop operating. A synchronizing arrangement is included in the apparatus and is connected to the plurality of devices. Inputs to the synchronizing mechanism are each connected to one of the devices to receive the first and second signals from that device, and an output of the synchronizing mechanism is connected to the plurality of devices to transmit the third and fourth signals to the devices. The synchronizing arrangement transmits the third signal upon sensing the first signal on each of its inputs. The synchronizing arrangement then continues to transmit the third signal while it continues to receive the first signal from at least one of the devices. The synchronizing arrangement transmits the fourth signal upon sensing the second signal on each of its inputs. The synchronizing arrangement then continues to transmit the fourth signal while it continues to receive the second signal from at least one of the devices. Thereby the operation of the plurality of devices is commenced and terminated in synchronism with the readiness to operate and the completion of operation of the slowest of the plurality of devices.

Advantageously, the plurality of devices comprise a plurality of FIFOs. In one arrangement the first and second signals represent the presence and absence of an output register empty signal and the third and fourth signals represent the presence and absence of a transfer off stack signal. In an alternative arrangement the first and second signals represent the presence and absence of an input register full signal and the third and fourth signals represent the presence and absence of a transfer to stack signal.

Preferably, the synchronizing arrangement comprises a circuit which produces a signal at its output that is either an AND combination or an OR combination of the signals received at its inputs, in response to whether the third or the fourth signal is being produced at its output. Advantageously, such synchronizing arrangement comprises a full adder circuit. A first set of binary word inputs and a carry input of the full adder include the synchronizing arrangement inputs. A carry output of the full adder includes the synchronizing arrangement output. A second set of binary word inputs of the full adder is connected to the carry output.

The inventive apparatus has numerous advantages. It is simple to implement. In particular, the synchronizing arrangement can be constructed of a commercially available part in a simple manner. The synchronous apparatus performs the required function of operating its constituent devices, both in terms of commencement and of termination of operation, in synchronism with the operation of the slowest of the plurality of devices. Yet the synchronous apparatus performs its function rapidly and satisfies the requirements of high speed applications such as the synchronous operation of data transfer-interfacing FIFOs in a computer system.

These and other advantages and features of the present invention will become apparent from the following description of an illustrative embodiment of the invention, taken together with the drawing.

DETAILED DESCRIPTION

Figure 1:
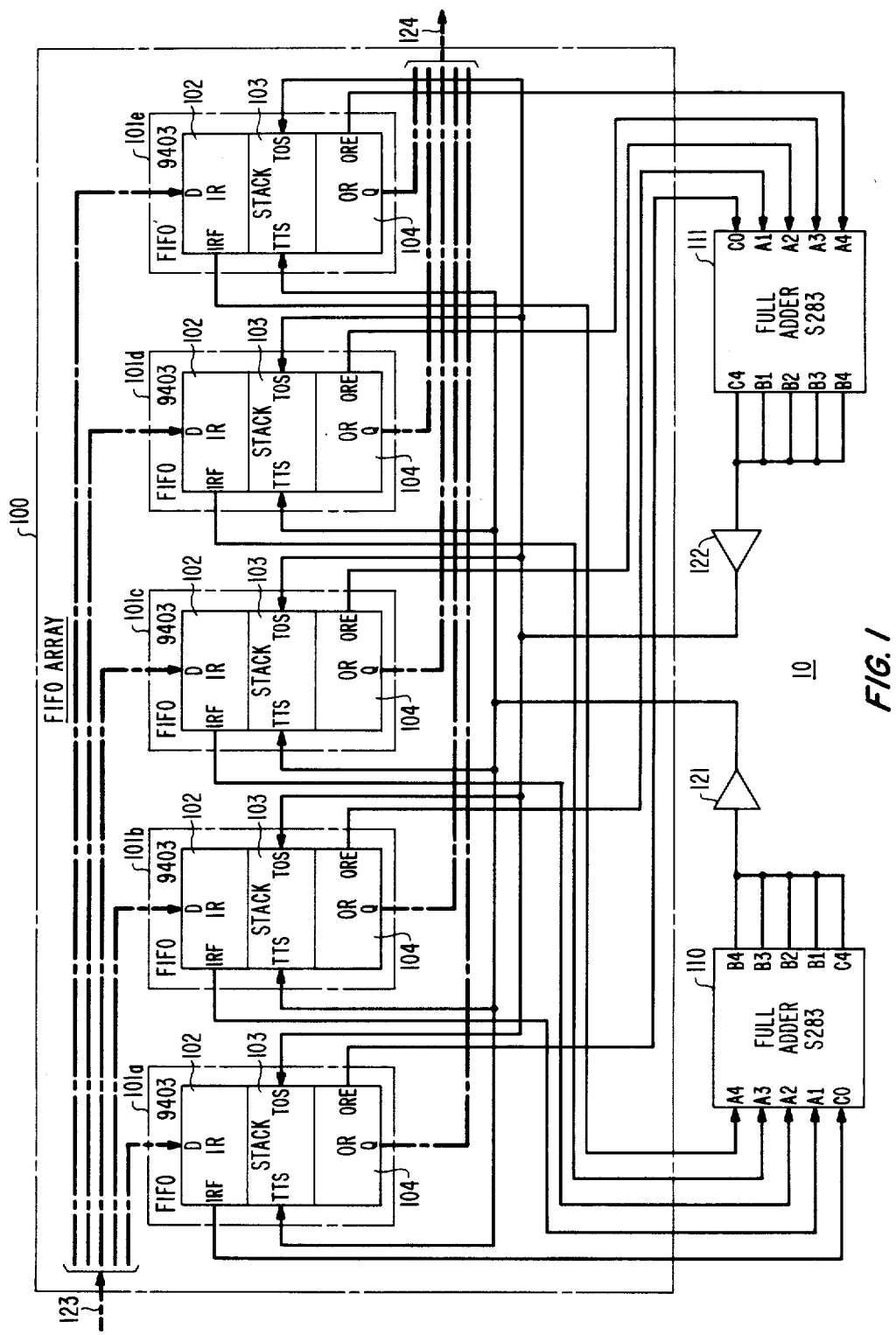
FIG. 1 is a block diagram of an embodiment of the inventive synchronous apparatus.

Turning now to the drawing, FIG. 1 shows an illustrative embodiment of a synchronous apparatus 10 configured according to the invention. The apparatus 10 includes an array 100 of first-in first-out buffer memories (FIFOs) 101. The FIFOs 101 are conventional devices. For example, the integrated circuit buffer device 9403 made by Fairchild Camera and Instrument Corporation, Mountain View, Calif., may be used.

The FIFO array 100 interfaces a communication input bus 123 to a communication output bus 124. The FIFO array 100 permits asynchronous communications to occur between the two buses 123 and 124, by temporarily storing communications received on the input bus 123 before sending them out on the output bus 124. In the example of FIG. 1, each of the buses 123 and 124 comprises 20 communication lines, and hence each bus 123 and 124 is capable of carrying 20 bits of data in parallel. However, each FIFO 101 of the FIFO array 100 is only four bits wide. Hence five FIFOs 101a–101e are included in the FIFO array 100 to interface the buses 123 and 124.

Each FIFO 101 comprises three portions: an input register (IR) 102, a stack 103, and an output register (OR) 104. The stack 103 serves as the storage portion of the FIFO 101. The function of the input register 102 is to receive nibbles of data each comprising four data bits from associated four lines of the input bus 123 and to transfer the nibbles to the stack 103 for storage. The function of the output register 104 is to removes nibbles of data from the stack 103 and to transmit them onto associated four lines of the output bus 124.

Relevant principles of operation of a FIFO 101 are as follows. In each FIFO 101, an input port, designated as D, of the input register 102 is connected to four lines of the input bus 123. The four lines represent four bits or one nibble of the 20 bit wide bus 123. The input register 102 is loaded with a nibble of data from the input bus 123 in a conventional manner. When the input register 102 has been loaded, the FIFO 101 asserts its IRF (input register full) output terminal to signal a synchronizing device 110 that the input register 102 is full and ready to transfer the nibble to the stack 103. The FIFO 101 is enabled to transfer the contents of its input register 102 to the top of the stack 103 when its TTS (transfer to stack) input terminal is asserted by the synchronizing device 110. When the input register 102 has been emptied, the FIFO 101 deasserts the IRF output terminal to signal the synchronizing device 110 that the input register 102 has completed transfer of the nibble to the stack 103 and that the input register 102 is empty. The FIFO 101 is prevented from making further transfers from the input register 102 to the stack 103 when its TTS input terminal is deasserted by the synchronizing device 110.

Likewise in each FIFO 101, an output port, designated as Q, of the output register 104 is connected to four lines of the output bus 124. The four lines represent four bits or one nibble of the 20 bit wide bus 124. Contents of the output register 104 are transferred onto the output bus 124 in a conventional manner. When its output register has been emptied, the FIFO 101 asserts its ORE (output register empty) output terminal to signal a synchronizing device 111 that the output register 104 is empty and ready to be loaded with a nibble from the stack 103. The FIFO 101 is enabled to transfer the bottom entry of the stack 103 into the output register 104 when its TOS (transfer off stack) input terminal is asserted by the synchronizing device 111. When the output register 104 has been filled, the FIFO 101 deasserts the ORE output terminal to signal the synchronizing device 111 that the transfer of the nibble from the stack 103 to the output register 104 has been completed and that the output register 104 is full. The FIFO 101 is prevented from making further transfers from the stack 103 to the output register 104 when its TOS input terminal is deasserted by the synchronizing device 111.

In order to synchronize the data input operation of the FIFOs 101a–101e such that the input registers 102 are all enabled to transfer and disabled from transferring their contents to the stack 103 simultaneously and in synchronism with the last input register 102 to become full and the last input register 102 to become empty, respectively, the synchronous apparatus 10 utilizes the synchronizing mechanism 110. Likewise, in order to synchronize the data output operation of the FIFOs 101a–101e such that the output registers 104 are all enabled to be loaded and disabled from being loaded with a nibble of data from the stack 103 simultaneously and in synchronism with the last output register 104 to become empty and the last output register 104 to become full, respectively, the synchronous apparatus 10 utilizes a synchronizing mechanism 111.

The mechanisms 110 and 111 are like circuits. As shown in FIG. 1, each synchronizing mechanism 110 and 111 may be a full adder, preferably a binary full adder with fast carry such as the device Ser. No. 745283 made by Texas Instruments Incorporated, Dallas, Tex. Each mechanism 110 and 111 has a plurality of input terminals and a single output terminal. Each mechanism 110 and 111 performs an AND/OR function: the mechanism asserts its output terminal upon the assertion of all of its input terminals to perform the AND portion of the function, and the mechanism deasserts its output terminal upon the deassertion of all of its input terminals to perform the OR portion of the function. Which portion of the AND/OR function is performed at any time is determined by whether the output terminal is asserted or deasserted at the time. The relevant portions of the logic of the full adder which provide the AND/OR synchronizing function in this example are diagramed in FIG. 2.

The synchronizing mechanism 110 has its input terminals connected to the IRF (input register full) output terminals of all five FIFOs 101a–101e. The output terminal of the synchronizing mechanism 110 is connected through a driver 121 to the TTS (transfer to stack) input terminals of all five FIFOs 101a–101e. Thus the synchronizing mechanism 110 asserts the TTS input terminals of all of the FIFOs 101 when it finds the IRF output terminals of all of the FIFOs 101 asserted. And the synchronizing mechanism 110 deasserts the TTS input terminals of all of the FIFOs 101 when it finds the IRF output terminals of all of the FIFOs 101 deasserted. Hence the synchronizing mechanism 110 synchronizes commencement of the data input operation of all of the FIFOs 101 with that of the slowest input register 102 of the FIFO array 100 to become full, and synchronizes the termination of the data input operation of all of the FIFOs 101 with that of the slowest input register 102 to become empty.

Similarly, the synchronizing mechanism 111 has its input terminals connected to the ORE (output register empty) output terminals of the FIFOs 101a–101e, and the output terminal of the synchronizing mechanism 111 is connected through a driver 122 to the TOS (transfer off stack) input terminals of the FIFOs 101a–101e. Thus the synchronizing mechanism 111 asserts the TOS input terminals of all of the FIFOs 101 when it finds the ORE output terminals of all of the FIFOs 101 asserted, and the synchronizing mechanism 111 deasserts the TOS input terminals of the FIFOs 101 when it finds the ORE output terminals of all of the FIFOs 101 deasserted. Hence the synchronizing mechanism 111 synchronizes the commencement of the data output operation of all of the FIFOs 101 with that of the slowest output register 104 of the FIFO array 100 to become empty, and synchronizes the termination of data output operation of all of the FIFOs 101 with that of the slowest output register 104 to become full.

Figure 2:
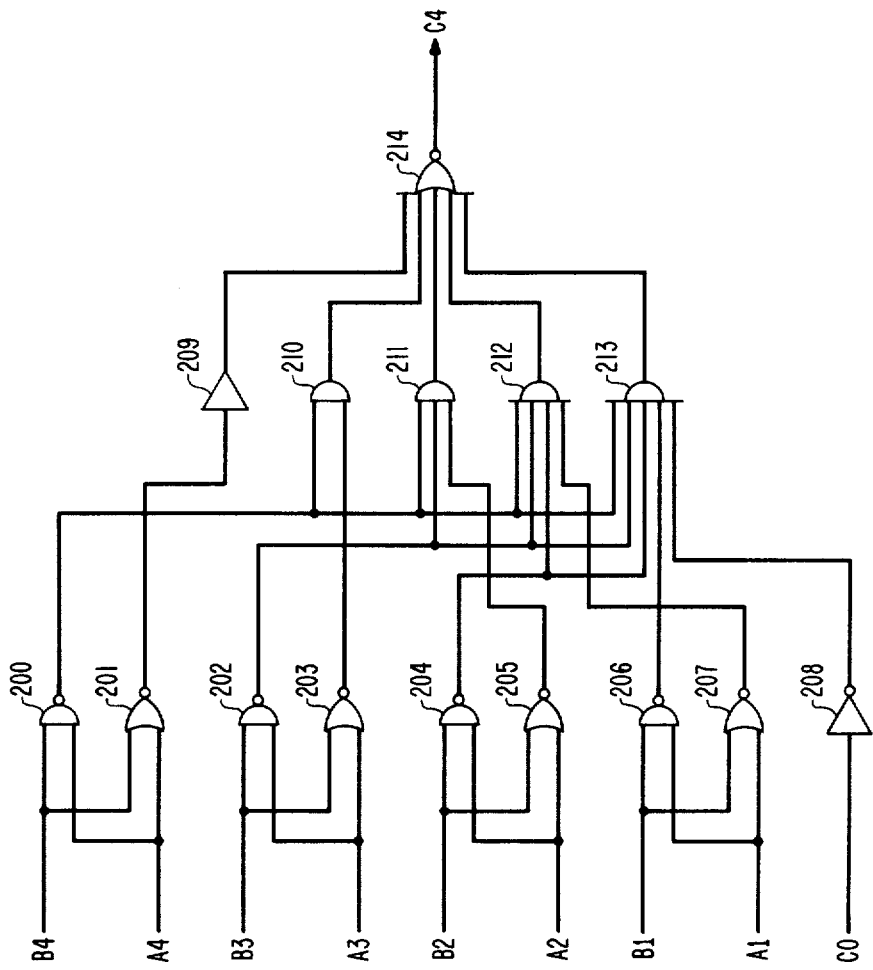
FIG. 2 is a logic diagram of the relevant circuitry of a full adder of FIG. 1.

As shown in FIG. 2, each full adder of the synchronizing mechanisms 110 and 111 has a plurality of input terminals A1-A4 which form a first binary word input port, a carry input terminal C0, a carry output terminal C4, and a plurality of external terminals B1-B4 which form a second binary word input port. Input terminals A4-A1 are connected to inputs of NOR gates 201, 203, 205 and 207, respectively. Input terminals A4-A1 are likewise connected to inputs of NAND gates 200, 202, 204 and 206, respectively. External terminals B4-B1 are similarly connected, to second inputs of the gates 200 and 201, 202 and 203, 204 and 205, and 206 and 207, respectively. Input terminal C0 is connected to the input of an inverter 208.

The output of the NOR gate 201 is connected to the input of a driver 209. The outputs of the NOR gates 203, 205, and 207 are connected to inputs of AND gates 210-212, respectively, and the output of the inverter 208 is connected to an input of an AND gate 213. The output of the NAND gate 200 is connected to inputs of the AND gates 210-213. The output of the NAND gate 202 is connected to inputs of the AND gates 211-213. The output of the NAND gate 204 is connected to inputs of the AND gates 212-213. And the output of the NAND gate 206 is connected to an input of the AND gate 213.

Outputs of the driver 209 and of the AND gates 210-213 are connected to inputs of a NOR gate 214. Output of the NOR gate 214 is connected to the output terminal C4.

Referring back to FIG. 1, the IRF output terminals of the FIFOs 101a-101e are connected to the C0 and A1-A4 input terminals of the full adder synchronizing mechanism 110. The C4 output terminal of the mechanism 110 is connected to the input of the driver 121 and to the external terminals B1-B4 of the mechanism 110. Likewise, the ORE output terminals of the FIFOs 101a-101e are connected to the C0 and A1-A4 input terminals of the full adder synchronizing mechanism 111. The C4 output terminal of the mechanism 111 is connected to the input of the driver 122 and to the external terminals B1-B4 of the mechanism 111.

FIGS. 1 and 2 will now be referred to together for an explanation of the operation of the circuit of FIG. 2. Assuming initially that the input terminals C0 and A1-A4 are deasserted, or in the logical "zero" state or signal level, the outputs of the NAND gates 200, 202, 204, and 206, and of the inverter 208 are in the logical "one" state or signal level. Hence the output of the AND gate 213 is in the logical "one" state, and therefore the output of the NOR gate 214 is in the logical "zero" state. This results in the output terminal C4 being deasserted, or in the logical "zero" state. And since the terminal C4 is connected to the terminals B1-B4, those terminals B1-B4 are likewise in the logical "zero" state, resulting in all of the gates 200-213 having logical "one" outputs.

As input terminals C0 and A1-A4 selectively become asserted, the outputs of various of the gates 201, 203, 205, 207 and 208 assume logical "zero" states, causing outputs of various of the gates 209-213 to assume logical "zero" states in response. However, the logical "zero" state of the terminals B1-B4 assures that the outputs of the NAND gates 200, 202, 204 and 206 maintain logical "one" states. All but one of the inputs of each of the gates 210-213 are maintained thereby at logical "one" states, and hence the output of at least one of the gates 209-213 remains at the logical "one" state for as long as at least one of the input terminals C0 and A1-A4 remains at logical "zero" state. This results in the output of the NOR gate 214 remaining in the logical "zero" state.

As soon as all input terminals C0 and A1-A4 assume logical "one" states, an input of each of the gates 209-213 assumes the logical "zero" state, resulting in all inputs of the NOR gate 214 being logical "zero". This causes the output of the NOR gate 214 to assume logical "one" state, and thus the output terminal C4 is placed in the logical "one" state.

Since the terminal C4 is connected to the terminals B1-B4, these terminals likewise assume the logical "one" state. This causes the outputs of the NAND gates 200, 202, 204, and 206 to assume the logical "zero" states. But since at least one input of the gates 209-213 is already at logical "zero" state, no change in the output of the gates 209-213 is caused thereby. The logical "one" states of the terminals B1-B4 assure that the outputs of the NOR gates 201, 203, 205, and 207 maintain logical "zero" states. At least one of the inputs of each of the gates 209-212 is maintained thereby in the logical "zero" state, and hence the outputs of all of the gates 209-212 remain at logical "zero" states.

As input terminals C0 and A1-A4 selectively become deasserted, the outputs of various of the gates 200, 202, 204, 206, and 208 assume logical "one" states in response. But for as long as at least one of the input terminals C0 and A1-A4 remains at the logical "one" state, at least one of the inputs to the AND gate 213 remains at the logical "zero" state, and hence the output of the gate 213 likewise remains at the logical "zero" state. This results in the output of the NOR gate 214 remaining in the logical "one" state.

As soon as all of the input terminals C0 and A1-A4 assume logical "zero" states, however, all of the inputs to the AND gate 213 become logical "one", causing the output of the gate 213 to become a logical "one". This causes the output of the NOR gate 214 to assume the logical "zero" state, and sends the output terminal C4, and hence the terminals B1-B4, into logical "zero" states. The initially assumed condition is thus reassumed by the circuit of FIG. 2.

Figure 3:
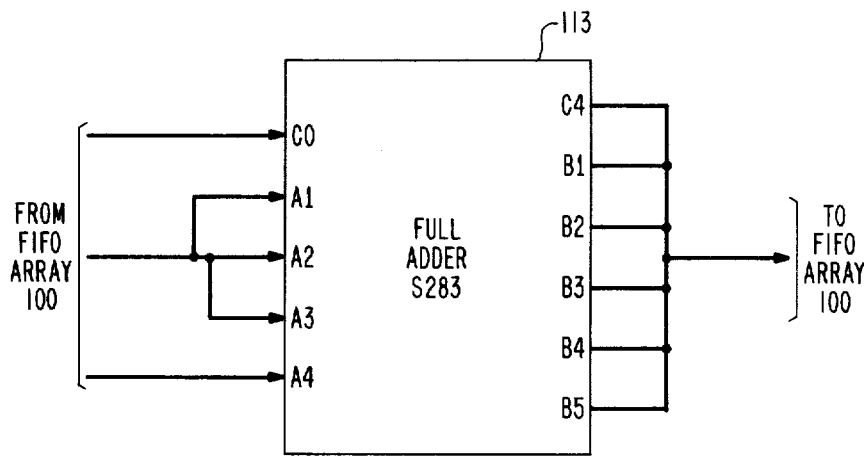
FIG. 3 is a block diagram of a full adder configured for a second embodiment of the apparatus.

While in FIG. 1 the FIFO array 100 is shown as comprising five FIFOs 101a-101e the FIFO array 100 may be constructed with more or fewer FIFOs 101. When fewer FIFOs 101 are utilized, the arrangement of each of the synchronizing mechanisms 110 and 111 becomes like the one shown for a full adder 113 in FIG. 3. For purposes of illustration, FIG. 3 assumes that the FIFO array 100 comprises three FIFOs 101. In such an arrangement output terminal of the FIFOs 101 are connected to any three of the input terminals C0 and A1-A4 of the synchronizing mechanism 113, for example to the terminals C0, A1, and A4, as shown. The remaining terminals A2 and A3 are then connected to any of the terminals C0, A1, and A4. For example, the terminals A2 and A3 may both be connected to terminal A1, as shown in FIG. 3. Alternatively, the terminal A2 may be connected to one of the terminals C0, A1, and A4, and the terminal A3 may be connected to another of the terminals C0, A1, and A4. The external terminals B1-B4 are again connected to the output terminal C4, and the terminal C4 is again connected to an input terminal of each of the FIFOs 101.

Figure 4:
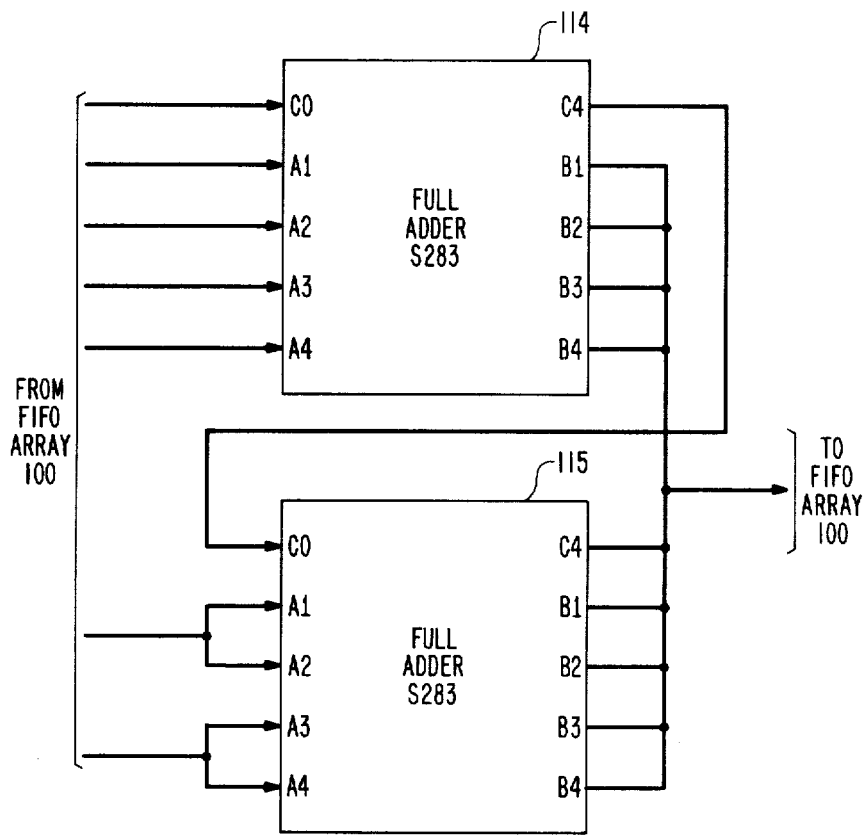
FIG. 4 is a block diagram of full adders configured for a third embodiment of the apparatus.

When more than five FIFOs 101 are utilized in the FIFO array 100, the arrangement of each of the synchronizing mechanisms 110 and 111 becomes like the one shown for full adders 114 and 115 in FIG. 4. For purposes of illustration, FIG. 4 assumes that the FIFO array 100 comprises seven FIFOs 101. In such an arrangement, each synchronizing mechanism 110 or 111 comprises two full adder circuits 114 and 115 of FIG. 2. An output terminal of each of the FIFOs 101 is connected to the circuits 114 and 115 at any of the input terminals C0 and A1-A4 of the one circuit 114 and at any of the input terminals A1-A4 of the other circuit 115. The unused of these input terminals are connected to one or more of the used of these input terminals, in the manner described for FIG. 3. The output terminal C4 of the one circuit 114 is connected to the input terminal C0 of the other circuit 115. And the external terminals B1-B4 of both circuits 114 and 115 are connected together and to the output terminal C4 of the circuit 115. The terminal C4 of the circuit 115 then connects to an input terminal of each of the FIFOs 101. Should ten or more FIFOs 101 be utilized in the FIFO array 100, further circuits of FIG. 2 may be cascaded in the manner shown in FIG. 4 to provide synchronization for all of the FIFOs 101.

Of course, various changes and modifications to the illustrative embodiment described above will be apparent to those skilled in the art. For example, devices other than FIFOs may be utilized and synchronized in the synchronous apparatus. The synchronous apparatus may comprise a serial array of devices. The synchronization in a FIFO array may be between the input register of one FIFO and the output register of another. Alternatively, the synchronization may be between the input register and the output register of the same FIFO, treating the registers as separate devices. Or a specially built circuit, as opposed to a full adder, may be utilized to implement the synchronizing circuit. The synchronizing circuit may also utilize negative logic for use with devices having input and output signals of opposite polarities from those herein described. Or logic configurations differing from that of FIG. 2 may be utilized to achieve like function. Such changes and modifications can be made without departing from the spirit and the scope of the invention and without diminishing its attendant advantages. It is therefore intended that such changes and modifications be covered by the following claims.

What is claimed is:

1. A synchronous apparatus comprising:
a plurality of devices for operating synchronously, each device having an output terminal for selectively generating thereon a first signal to indicate readiness to operate and a second signal to indicate completion of operation, each device further having an input terminal for receiving thereon a third signal for causing the device to operate and a fourth signal for causing the device to stop operating; and synchronizing means, having a plurality of input terminal means connected to the output terminals of the plurality of devices and output terminal means connected to the input terminals of the plurality of devices, adapted to initiate generating on its output terminal means the third signal upon sensing the first signal on all of its input terminal means and to continue to generate the third signal while the first signal is present on at least one of its input terminal means, the means further adapted to initiate generating on its output terminal means the fourth signal upon sensing the second signal on all of its input terminal means and for continuing to generate the fourth signal while the second signal is present on at least one of its input terminal means, thereby to synchronize the operation of the plurality of devices with the slowest of the plurality of devices.

2. The apparatus of claim 1 wherein the plurality of devices comprises at least one first-in first-out buffer memory.

3. The apparatus of claim 1 wherein the plurality of devices comprises at least one first-in first-out buffer memory, wherein the output terminal is an output register empty signal output terminal, and wherein the input terminal is a transfer off stack signal input terminal.

4. The apparatus of claim 1 wherein the plurality of devices comprises at least one first-in first-out buffer memory, wherein the output terminal is an input register full signal output terminal and wherein the input terminal is a transfer to stack signal input terminal.

5. The apparatus of claim 1 wherein the synchronizing means comprise a circuit for selectively producing the third and fourth signals as one of an AND and an OR combination of the first and second signals in response to the presence of one and the other, respectively, of the third and fourth signals at the output terminal means.

6. The apparatus of claim 1 wherein the synchronizing means comprise a circuit for initiating generation of the third signal as an AND combination of the first signals and for continuing generation of the third signal as an OR combination of the first signals, the circuit further for initiating generation of the fourth signal as an AND combination of the second signals and for continuing generation of the fourth signal as an OR combination of the second signals.

7. The apparatus of claim 1 wherein the synchronizing means comprise at least one full adder circuit.

8. The apparatus of claim 1 wherein the synchronizing means comprise at least one full adder circuit having a first and a second set of binary word input terminals, a carry input terminal, and a carry output terminal, such that the input terminal means of the synchronizing means include the first set of binary word input terminals and the carry input terminal, the output terminal means of the synchronizing means include the carry output terminal, and the second set of binary word input terminals are connected to the carry output terminal.

9. A synchronous apparatus for synchronizing transfers of data comprising:
(A) a plurality of first-in first-out data buffer memories each having
(1) an output terminal selectively having
(i) a first signal level indicative of readiness to transfer data and
(ii) a second signal level indicative of completion of data transfer, and
(2) an input terminal for selectively assuming a first signal level to enable data transfer and a second signal level to disable data transfer; and
(B) a logic circuit, connected from the input terminals to the output terminals of the plurality of first-in first-out buffer memories, for selectively generating on the input terminals
(1) the first and second signal levels corresponding to an AND combination of the signal levels on the output terminals, and (2) the first and second signal levels corresponding to an OR combination of the signal levels on the output terminals, in response to the current signal level of the input terminals, whereby data transfers of the plurality of buffer memories are synchronized with data transfers of the slowest of the plurality of buffer memories.

10. A synchronous apparatus for synchronizing transfers of data comprising:
(A) a plurality of first-in first-out data buffer memories each having
  (1) an output terminal selectively having
    (i) a first signal level indicative of readiness to transfer data and
    (ii) a second signal level indicative of completion of data transfer, and
  (2) an input terminal for selectively assuming
    (i) a first signal level to enable data transfer and
    (ii) a second signal level to disable data transfer; and
(B) at least one full adder circuit having
  (1) a first binary word input port and a carry input terminal connected to the output terminals of the plurality of buffer memories,
  (2) a carry output terminal connected to the input terminals of the plurality of buffer memories, and
  (3) a second binary word input port connected to the carry output terminal, whereby data transfers of the plurality of buffer memories are synchronized with data transfers of the slowest of the plurality of buffer memories.

11. A synchronous apparatus for synchronizing transfers of data comprising:
(A) a plurality of first-in first-out data buffer memories each having
  (1) an output terminal selectively having
    (i) a first signal level indicative of readiness to transfer data and
    (ii) a second signal level indicative of completion of data transfer, and
  (2) an input terminal for selectively assuming
    (i) a first signal level to enable data transfer and
    (ii) a second signal level to disable data transfer; and
(B) a plurality of full adder circuits each having a first and a second plurality of binary input terminals, a carry input terminal, and a carry output terminal, the full adder circuits being configured such that
  (1) (i) all but one of the carry input terminals and the first plurality of binary input terminals of all but a first one of the full adder circuits, and
    (ii) the carry input terminal and the first plurality of binary input terminals of the first one of the full adder circuits,
  are connected to the output terminals of the buffer memories,
  (2) the carry output terminals of all but a last one of the full adder circuits are connected to the ones of the carry input terminals and the first plurality of binary input terminals not connected to the output terminals of the buffer memories,
  (3) the carry output terminal of the last one of the full adder circuits is connected to the output terminals of the buffer memories and
  (4) the second plurality of binary input terminals of each full adder circuit is connected to the carry output terminal of the last one of the full adder circuits, whereby data transfers of the plurality of buffer memories are synchronized with data transfers of the slowest of the plurality of buffer memories.

12. A synchronous data transfer arrangement comprising a plurality of first-in first-out buffer memories each adapted to generate a readiness signal indicative of readiness to transfer data and a completion signal indicative of completion of data transfer and responsive to an enable signal to enable transfer operations and to a disable signal to disable transfer operations; and
synchronizing means connected to said buffer memories and responsive to the concurrent appearance of said readiness signals to initiate and apply the enable signal to all of said memories simultaneously and to continue application of said enable signal while a readiness signal is generated by any one of said memories, the synchronizing means further responsive to the concurrent appearance of said completion signals to initiate and apply the disable signal to all of said memories simultaneously and to continue application of said disable signal while a completion signal is generated by any one of said memories.

13. A data transfer arrangement for transferring data between a pair of data buses, comprising a plurality of buffer memories each having an input register connected to one of the data buses for receiving data therefrom, a memory stack connected to the input register, and an output register connected to the memory stack and to the other of the data buses for transmitting data thereon, each buffer memory adapted to generate an input readiness signal and an output readiness signal and each responsive to an input transfer signal to transfer data from the input register to the memory stack and responsive to an output transfer signal to transfer data from the memory stack to the output register;
synchronizing means responsive to the concurrent generation of said input readiness signals by all of said memories to initiate and apply said input transfer signal to all of said memories simultaneously and to continue the application of said input transfer signal as long as at least one of said memories is generating said input readiness signal, and responsive to the concurrent generation of said output readiness signals by all of said memories to initiate and apply said output transfer signal to all of said memories simultaneously and to continue the application of said output transfer signal as long as at least one of said memories is generating said output readiness signal;
whereby data is transferred between two data buses by means of a plurality of independent buffer memories acting in unison.

* * * * *

UNITED STATES PATENT AND TRADEMARK OFFICE
CERTIFICATE OF CORRECTION

PATENT NO. : 4,493,053

DATED : January 8, 1985

INVENTOR(S) : Dennis J. Thompson

It is certified that error appears in the above-identified patent and that said Letters Patent is hereby corrected as shown below:

Column 6, line 46, after "101e" insert a comma.

Signed and Sealed this

Twentieth Day of August 1985

[SEAL]

Attest:

DONALD J. QUIGG

Attesting Officer

Acting Commissioner of Patents and Trademarks